United States Patent
Hayes et al.

(10) Patent No.: US 10,479,704 B2
(45) Date of Patent: Nov. 19, 2019

(54) PROPPANTS FOR REMOVAL OF CONTAMINANTS FROM FLUID STREAMS AND METHODS OF USING SAME

(71) Applicant: THE FRAZER AND CRUICKSHANK LIVING TRUST DATED Mar. 24, 1982

(72) Inventors: Missy Hayes, Sagamore Hills, OH (US); Gina Sacco, Warren, OH (US); Nancy S. Sherwood, Wellsville, OH (US)

(73) Assignee: THE FRAZER AND CRUICKSHANK LIVING TRUST DATED Mar. 24, 1982, Christiansted, VI (US)

(*) Notice: Subject to any disclaimer, the term of this patent is extended or adjusted under 35 U.S.C. 154(b) by 0 days.

(21) Appl. No.: 15/908,525

(22) Filed: Feb. 28, 2018

(65) Prior Publication Data

US 2018/0186661 A1  Jul. 5, 2018

Related U.S. Application Data

(60) Continuation of application No. 14/700,415, filed on Apr. 30, 2015, now Pat. No. 9,932,244, which is a
(Continued)

(51) Int. Cl.
| | |
|---|---|
| *C02F 1/28* | (2006.01) |
| *C09K 8/536* | (2006.01) |
| *C09K 8/80* | (2006.01) |
| *B01D 15/08* | (2006.01) |
| *B01D 53/02* | (2006.01) |
| *C09K 8/52* | (2006.01) |
| *C02F 101/10* | (2006.01) |
| *C02F 101/14* | (2006.01) |

(Continued)

(52) U.S. Cl.
CPC .............. *C02F 1/285* (2013.01); *B01D 15/08* (2013.01); *B01D 53/02* (2013.01); *C09K 8/52* (2013.01); *C09K 8/536* (2013.01); *C09K 8/80* (2013.01); *B01D 2253/202* (2013.01); *B01D 2257/408* (2013.01); *B01D 2257/60* (2013.01); *B01D 2257/70* (2013.01); *C02F 2101/103* (2013.01); *C02F 2101/106* (2013.01); *C02F 2101/108* (2013.01); *C02F 2101/14* (2013.01); *C02F 2101/18* (2013.01); *C02F 2101/20* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 3,740,331 A | 6/1973 | Anderson et al. | |
| 5,401,282 A * | 3/1995 | Leininger | C10J 3/06 |
| | | | 252/373 |

(Continued)

*Primary Examiner* — Jeffrey D Washville
(74) *Attorney, Agent, or Firm* — Wilmer Cutler Pickering Hale and Dorr LLP

(57) ABSTRACT

The invention relates to the proppants and proppant substrates treated with active compounds that reduce the presence of contaminants in fluids, methods of using those materials, as well as methods of making those materials. The invention further provides that the contaminated fluids are associated with wells, including oil and gas wells.

9 Claims, 2 Drawing Sheets

Related U.S. Application Data division of application No. 13/495,908, filed on Jun. 13, 2012, now Pat. No. 9,822,296.

(60) Provisional application No. 61/497,357, filed on Jun. 15, 2011.

(51) Int. Cl.
  *C02F 101/18* (2006.01)
  *C02F 101/20* (2006.01)
  *C02F 103/10* (2006.01)

(56) References Cited

U.S. PATENT DOCUMENTS

| | | |
|---|---|---|
| 5,975,798 A | 11/1999 | Liskowitz et al. |
| 9,822,296 B2 | 11/2017 | Hayes et al. |
| 9,932,244 B2 | 4/2018 | Hayes et al. |
| 2002/0058581 A1 | 5/2002 | Youngman et al. |
| 2003/0195121 A1 | 10/2003 | Fitzgerald |
| 2006/0157243 A1 | 7/2006 | Nguyen |
| 2008/0011662 A1* | 1/2008 | Milosavljevic .... B01D 46/0023 210/284 |
| 2008/0156489 A1 | 7/2008 | Pershikova et al. |
| 2009/0266766 A1 | 10/2009 | Huang et al. |
| 2010/0018710 A1 | 1/2010 | Leshchyshyn et al. |
| 2011/0162837 A1 | 7/2011 | O'Malley et al. |

* cited by examiner

PROPPANTS FOR REMOVAL OF CONTAMINANTS FROM FLUID STREAMS AND METHODS OF USING SAME

RELATED APPLICATIONS

This application is a continuation of U.S. patent application Ser. No. 14/700,415, filed Apr. 30, 2015, which is a divisional of U.S. patent application Ser. No. 13/495,908, filed Jun. 13, 2012, now U.S. Pat. No. 9,822,296, which is related to, and claims the benefit of the filing date of, U.S. Provisional Application No. 61/497,357, entitled "Proppant Media for Removal of Contaminants from Fluid Streams and Method of Making and Using Same," filed Jun. 15, 2011, the contents of each of which are incorporated by reference herein.

FIELD OF THE INVENTION

The present invention relates to proppants that contain additional reacted sorbent chemistry throughout their surfaces that remove and reduce the levels of contaminants in fluids associated with oil and gas well fracturing and production.

BACKGROUND OF THE INVENTION

A general description of well technology is discussed in U.S. Pat. No. 6,372,678, entitled "Proppant Compositions for Gas and Oil Well Fracturing," which issued Apr. 16, 2002 and is hereby incorporated by reference.

In the drilling, completion and operation of oil wells, gas wells, water wells and similar boreholes, it frequently is desirable to alter the producing characteristics of the formation by treating the well. Many such treatments involve the use of particulate material. For example, in hydraulic fracturing, particles called proppants are used to maintain the fracture in a propped, or open, condition. Common proppants used in the well industry are composed of sand, resin coated sand, ceramics, walnut shells, sintered bauxite, clay, engineered particulates and other solid particles.

The rock formations and liquids associated with oil and gas production are known to contain dissolved and suspended ions, compounds and solids that can be hazardous to human health and the environment. Conditions in the rock formation including rock composition, rock solubility, pressure and interstitial and formation water content can cause undesirable chemical elements and compounds to form in underground water and in waters injected into a rock formation. Examples of chemical elements and compounds that develop and concentrate in oilfield waters are heavy metals, organometallics, inorganic salts and organic compounds. When the hydrofacturing waters flow back to the surface or are produced at the surface, the presence of metals and other inorganic and organic compounds limit reuse of the water and represent a disposal and handling hazard to humans, wildlife and the environment.

Hydrofracturing commonly utilizes three to ten million gallons of water per single well application. While a high percentage of the water remains down hole, a significant number of gallons return up the well bore to the surface as flow back water and eventually as produced water at the well site. Reuse of this water is desirable for continued fracturing fluid make-up and other production associated uses especially in drought restricted areas. The presence of water soluble metals and other contaminants from down hole often limit this reuse and typically require wastewater treatment at the surface. In addition, when the disposal of flow back water and produced water is necessary it is restricted by the presence of metals, organometallics, inorganic salt and organic soluble contaminants.

All metals, including heavy metals and D-block metals, can be present in the waste liquids. Especially hazardous are mercury, selenium, arsenic, antimony and cadmium. In addition other constituents such as cyanide, fluoride and boron can contaminate flow back and produced waters. Typical inorganic salt contaminants are sodium, magnesium and calcium chlorides, sulfates, nitrates, strontium and barium.

Mercury exposure has been associated with neurological and developmental damage in humans. Arsenic is poison and classified as a human carcinogen. Selenium is a human and environmental toxin. The levels of these and other contaminants in water are regulated by both USA State and Federal Governments and typically they require removal treatment to meet discharge permit levels.

Sorbents are known contaminant removal agents. Activated carbons and functionalized aluminas are examples of effective sorbents used in industrial wastewater treatment. The mechanism of removal of metals and other contaminants by sorbents is by bonding of the contaminant to the adsorbent surface as water containing the contaminant comes in contact with the adsorbent. Activated carbon often is impregnated with additional chemistry that has a bonding affinity for selected contaminants.

Functionalized alumina is an alumina substrate upon which chemistries with affinities for soluble metals are reacted onto the alumina to generate active adsorption sites. In the removal of metals and other contaminants by a functionalized alumina sorbent, it is generally the reacted sites that complex with the soluble metals in fluids to form bonded metal complexes on the surface of the alumina. For instance, sulfur reacted onto an alumina substrate will form mercuric sulfide on the alumina surface when water containing soluble mercury comes in contact with the sorbent. Mercury is removed from the water and permanently bonded to the adsorbent material.

BRIEF SUMMARY OF THE INVENTION

The invention includes sorption compositions and methods of using the same that are designed to remove contaminants from fluids.

In one aspect of the invention, the sorption composition, comprises a proppant material and an active compound for contaminant removal incorporated into or onto the proppant material.

In another aspect of the invention, the proppant material is selected from the group consisting of sand, coated sand, resin treated sand zeolites, and calcined zeolites In a further aspect of the invention, the proppant material is selected from the group consisting of activated alumina and alumina based materials, spent Claus catalyst, spent FCC catalyst, and alumina-silica industrial processed waste.

In still another aspect of the invention, the proppant material is selected from the group consisting of clay and admixtures containing clay.

In yet another aspect of the invention, the proppant material is selected from the group consisting of ceramic, admixtures containing ceramics, and ceramic beads.

In a further aspect of the invention, the proppant material is a carbon based material or admixture containing carbon.

In another aspect of the invention, the proppant material contains at least 0.1% iron.

In yet another aspect of the invention, the proppant material contains at least 0.1% copper In still another aspect of the invention, the proppant material contains both iron and copper.

In another aspect of the invention, the proppant material contains oxides of copper and iron.

In a further aspect of the invention, the active compound is a sulfur compound.

In another aspect of the invention, the sulfur compound is selected from the group consisting of ferrous sulfide, ferrous sulfate, ferric sulfate, elemental sulfur, ferric ammonium sulfate, sodium hydrosulfide, dimethyl disulfide, dithiocarbamates, aluminum sulfate, aluminum sulfide, copper sulfate, copper sulfide, and copper sulfate ammoniated.

In another aspect of the invention, the active compound is an ammonia compound.

In yet another aspect of the invention, the ammonia compound is selected from the group consisting of ferric ammonium sulfate, ammonium thiosulfate, ammonium thiocyanate, ammonium sulfate, ammonium sulfite, ammonium persulfate, and aluminum ammonium sulfate.

In a still further aspect of the invention, the active compound is a metallic compound.

In another aspect of the invention, the metallic compound is selected from the group consisting of copper silicate, copper oxide, copper hydroxide, copper chloride, ferric hydroxide, ferric oxide and ferrous oxide.

The invention also includes a method of reducing the level of contamination of a fluid, comprising: contacting the fluid containing the contaminant with a sorption composition comprising a proppant material and an active compound incorporated into or onto to the proppant material.

In another aspect of the invention, the method is used on a fluid is selected from the group consisting of an aqueous liquid, a gas, and an oil.

In a further aspect of the invention, the fluid is predominantly aqueous. In another aspect of the inventions, the fluid also contains hydrocarbons. In still another aspect of the invention, the hydrocarbons are gaseous. In a still further aspect of the invention, the hydrocarbons are liquid. In yet another aspect of the invention, the hydrocarbons are a mixture of oil and gas hydrocarbons.

In a further aspect of the invention, the fluid is flow back water from a well treatment application. In another aspect of the invention, the fluid is produced water from a rock formation.

In another aspect of the invention, the contaminant is selected from the group consisting of arsenic, selenium, mercury, a d-block transition metal, a heavy metal, fluoride, fluoride compounds, cyanide, cyano compounds, inorganic salts, radioactive compounds, and organic metallic compounds.

In another aspect of the invention, the contaminant is a mixture of contaminants.

In a further aspect of the invention, the mixture of contaminants contains at least one of the following contaminants: arsenic, selenium, mercury, a d-block transition metal, a heavy metal, fluoride, fluoride compounds, cyanide, cyano compounds, inorganic salts, radioactive compounds, and organic metallic compounds.

In yet another aspect of the invention, the contaminant is down hole within a rock formation that is being fractured.

In still another method of the invention, the contaminant is down hole within a rock formation that was previously fractured.

One aspect of the invention includes, a method of making a sorption composition comprising: selecting a proppant material; optionally promoting that proppant material; reacting the substrate with a compound for contaminant removal such that it is incorporated into or onto the proppant material.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF THE INVENTION

Figure 1:
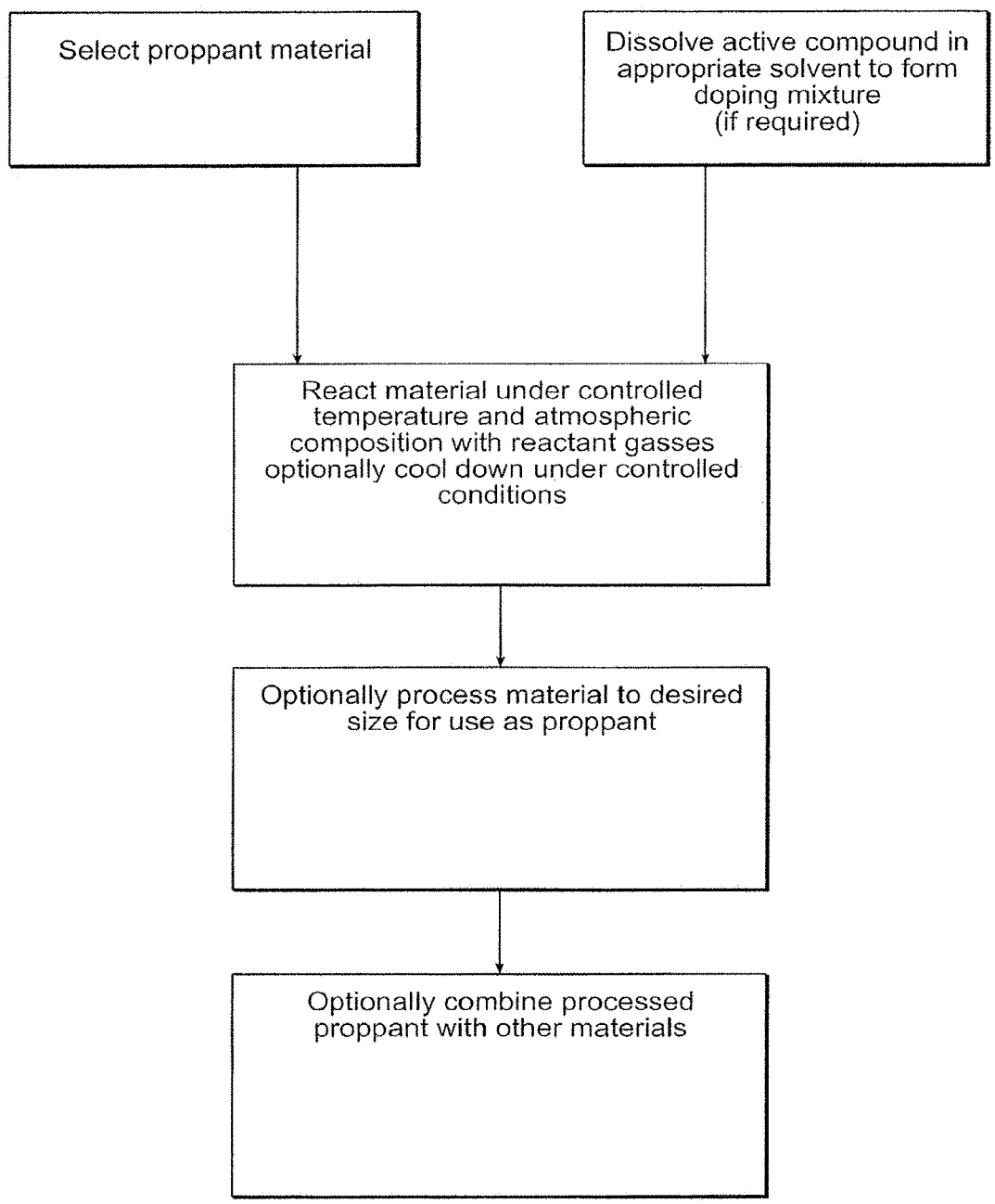
FIG. 1 shows a method of making an embodiment of a sorption media.
Figure 2:
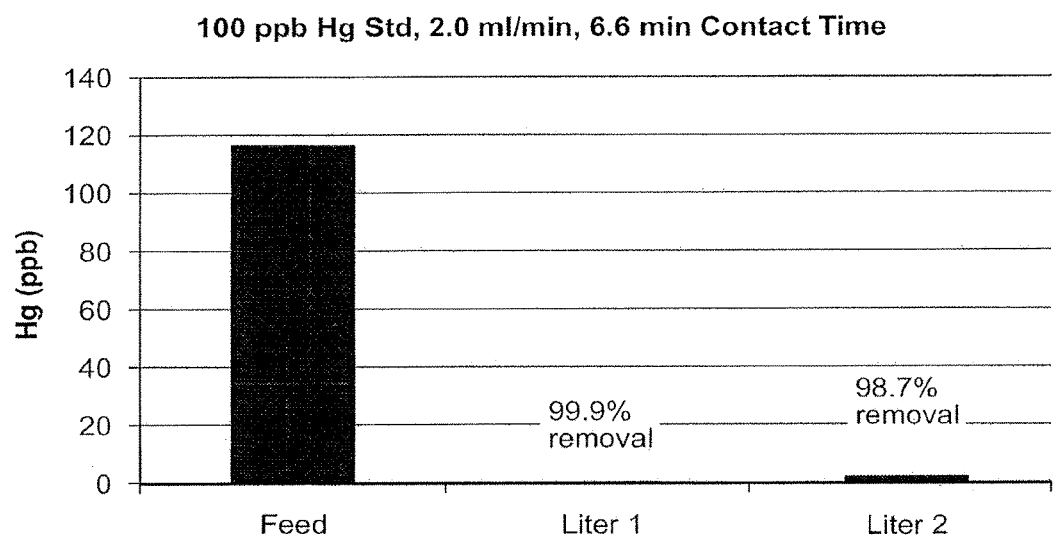
FIG. 2 shows the results of a flow-through column test of using a treated iron-doped sand media to remove mercury from a 100 µg/L mercury solution.
Figure 3:
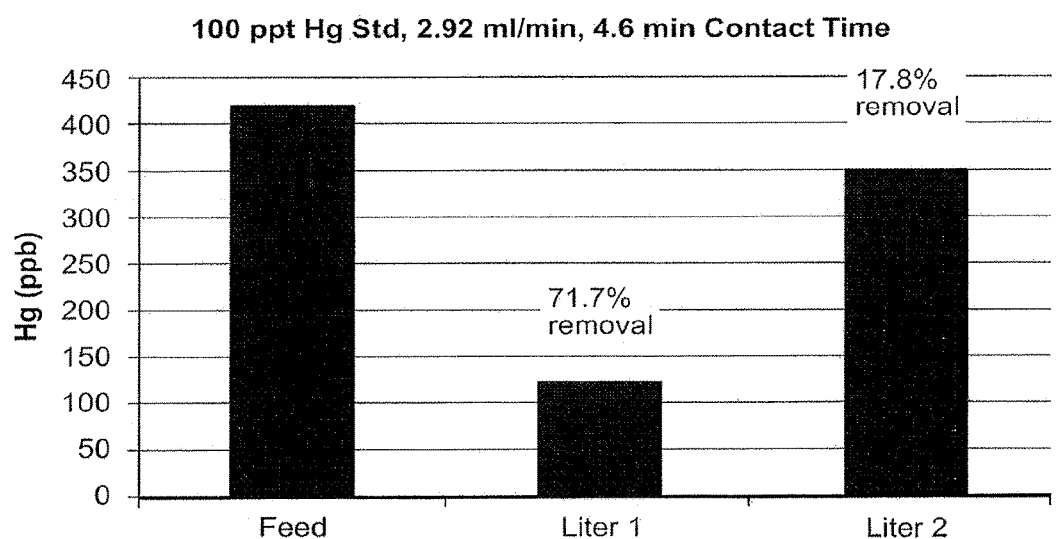
FIG. 3 shows the results of a flow-through column test of using a treated iron-doped sand media to remove mercury from a 100 ng/L mercury solution.

As is well-known in the field, proppants can be used in oil and gas well fracturing. The proppant may be injected into the well with the fracturing fluid and holds the fracture formation open to allow the oil and gas to be removed. Some amount of the proppant stays in the formation during oil and gas removal. In some embodiments, the sorption media comprising proppant as described herein is used in oil and gas wells to remove contaminants such as heavy metals in the well when extracting oil and natural gas. In other embodiments, the sorption media comprising proppant as described herein is used for in-situ down-hole removal of contaminants such as heavy metals from water produced by the wells. In other words, because the sorption media comprising proppant takes-on contaminants (e.g., by adsorption, absorption, and/or chemical interaction) and because some portion of the proppant remains in the well during oil and gas production, some amount of contaminants remain in the well. This enables an oil and/or gas fluid to be extracted from the well that has a reduced amount of contaminants therein.

The present invention utilizes proppants and proppant substrates into which active sorbent sites have been incorporated. Certain embodiments remove metals and other contaminants from fluids down hole to prevent the contaminants from reaching the surface where they become a hazard to human health and the environment. The proppants can be sand, ceramics, zeolite or any particulate capable of taking a sorbent reaction that provides functionalized sites capable of contaminant removal while maintaining typical proppant stress strength and conductivity properties for well treatment use. The proppant material of the present invention may be used on any fluids or mixture of fluids, including but not limited to aqueous, gaseous, oil, mixed hydrocarbons, or mixed hydrocarbon and aqueous fluids.

Embodiments of the present invention provide a proppant substrate and a sulfur species chemically bonded to the support substrate. They also provide a proppant substrate with ammonia and iron species chemically bonded to the substrate. The sulfur, ammonia and iron species are reacted in a selected atmospheric environment comprising at least hydrogen sulfide to ionic or covalently bond the species to the support substrate to form an adsorption media/sorbent material.

Embodiments of the present invention further provide that this proppant based sorbent material, when placed down hole in a well treatment, will remove metals and other contaminants from hydrofracturing flow back and produced fluids. Removal is accomplished by the complexation and bonding of soluble metals in the fluids to the sulfur, ammonia and iron sites on the proppant as the water flows past the proppant as it is being placed in the fissure sites within the rock formation or after it is in place and occupies the fracture zone. Adsorption of contaminants by the proppant down hole keeps the contaminant trapped in the formation rock and reduces the contaminant hazard of flow back and produced waters once they reach the surface.

Embodiments of the present invention utilize a contaminant removing sand, ceramic or alumina proppant that in addition to performing proppant fracturing fissure support activities, also functions as a sorbent media to remove metals and other contaminants from oil and gas well flow back and produced waters.

The sorption media for reducing contaminant levels in a fluid stream can include a support substrate or matrix bound to, or linked, with an active compound that provides a bonding site for metals removal. Non-limiting examples of support substrates include silicon sand; silicon based ceramics such as structural clay products (brick, tile, terra cotta, glazed brick), refractories, abrasives such as fused alumina and silicon carbide, porcelain enamels, Portland cement and gypsum products, and whitewares; activated alumina; resin coated sand; zeolites; Haydite™; refinery catalysts; carbon; spent Claus catalyst/used alumina; spent fluid catalytic cracking ("FCC") catalyst; titanium; walnut shells; alumina-silica industrial process waste; and other particulates of suitable crush strength and conductivity for proppant use. The support substrates are preferred to contain at least 0.1% iron, preferably as iron oxide, and/or at least 0.1% copper. Five percent to 15% is the preferred range. Iron and copper oxides in the substrate can be either present naturally in the proppant or the proppant can be promoted or doped with iron and/or copper.

Non-limiting examples of active compounds that provide a bonding site for metals removal include sulfur, iron-sulfur compounds, copper-sulfur compounds and ammonium compounds. Specifically these include ferric chloride, ferric sulfate, copper sulfate, iron sulfide, copper sulfide, ammonium sulfate, ammonium sulfide, aluminum ammonium sulfate, aluminum oxide, aluminum sulfate, silica-aluminum oxides. The active compound incorporated in or on to a proppant represents a novel composition. This composition represents the proppant plus the sulfur and ammonia based active compounds reacted onto the proppant, especially at the iron and/or copper promoted sites.

Without being limited to any particular theory, it is believed that in the sorption media, the active compounds mentioned above are bound, bonded or linked to the proppant support substrate so that any loss of the active compound into the fluid stream is minimized. This results in a sorption media with a high and sustained ability to continuously remove targeted contaminants.

In certain embodiments, the support substrate and active compound form a chemical compound by covalent and ionic bonding that holds the active compound in place. It is also believed that other attraction forces reduce the mobility of the active compound. For example, the active compound and support substrate may exhibit one or more of dipole-dipole interactions, hydrogen bonding and/or dispersion forces. Due to the formation of such bonds, the active compound cannot be completely solvated by the contaminated fluid and the dissolution rate of the active compound is significantly reduced, so that contaminant removal is sustained.

It is further believed that mechanical forces can play a role in reducing the mobility of the active compound. For example, the active compound and its complexes with the substrate can be lodged into small pores in the surface of the support substrate, thereby confining the material within the pores.

Non-limiting examples of contaminants removed by the proppant based sorbent include mercury, selenium, arsenic, vanadium, tin, chromium, cadmium, molybdenum, lead, copper, manganese, antimony, zinc, nickel, uranium and all the heavy and D-block or transition metals. Other examples of contaminants removed by the invention include fluoride, strontium, barium, sulfate, phosphate, nitrate, nitrite, boron, chloride and radioactive substances. These contaminants are reduced from a fluid stream by one or more of the processes of chemical adsorption/chemisorption, absorption and/or physical adsorption.

In some embodiments the active compound for sorption of mercury is believed to be ferric sulfate, ferric sulfide, aluminum sulfate and/or aluminum sulfide. The sulfur compounds present also remove selenium, cyanide and other contaminants capable of complexing with the sulfur compounds. Meanwhile, it is thought that polarized iron (e.g. iron in a salt complex) is effective for sorption of arsenic and selenium. The ammonium salts formed in the sorbent from the reaction of residual water in a reducing atmosphere are believed to be effective for the removal of selenium. Alumina and iron remove the fluoride, arsenic and other contaminants capable of complexing with aluminum compounds.

In some embodiments, the proppant substrate requires additional processing before it can be used as a proppant. For example, the proppant substrate may need to be hardened, heated, cured, or subjected to any other finishing method known in the art. Embodiments of the present invention include incorporating the active sorbent sites in the proppant substrate prior to finishing the proppant. Further embodiments include incorporating active sorbent sites in a mixture of finished and unfinished proppant substrate. Still further embodiments include incorporating the active sorbent sites into or onto a finished proppant.

In some embodiments, sorbent proppant compositions are prepared by a method comprising the steps of providing iron or copper promoted proppant particles, adding sulfur and heating the mixture in the presence of a hydrogen, nitrogen and hydrogen sulfide gas atmosphere.

In some embodiments, the sulfur can be added as dry elemental sulfur or as a liquid in the form of sodium hydrosulfide. Other compounds useful for generating active compounds for metals removal on proppant substrates are ferric sulfate, ammonium sulfate, copper sulfate, copper chloride, ferric chloride and dimethyl disulfide. The sulfur content, as % S is preferably from 0.1 to 25 wt. %. The sulfur and promoted proppant are then heated to between 100 F° to 500 F° and maintained at the temperature for a period of 0.25 hours to 5 hours, preferably at least 300 F° for more than 2 hours. At the preferred temperature and reaction time, the gas ratio fed to the mixture should be primarily hydrogen with small amounts of nitrogen and hydrogen sulfide. Preferably the hydrogen is at least 30% of the gas total. Optionally, the material can be agitated during the treatment period. Sorbent proppants capable of removing high levels of mercury can be produced across a range of % sulfur, temperature and reaction time, Table 1. Sulfur analysis was conducted by Envantage Company, Cleveland, Ohio using a Leco combustion analyzer.

TABLE 1

| Proppant Substrate | % S | Avg. Reaction Temp. | Reaction Time | % Mercury Removal |
|---|---|---|---|---|
| Activated Alumina | 12.8 | 408 F. | 180 min. | 94% |
| Activated Alumina | 7.6 | 377 F. | 180 min | 90% |
| Sand | 0.13 | 392 | 120 min | 96% |

Example 1

One of the most common proppants is sand. An iron promoted sand was obtained from Best Sand, Chardon, Ohio Two reaction runs using this sand were prepared. In each run, 60 grams of iron promoted/doped sand was placed in a glass reaction tube at 200 C° for two hours with a 5% hydrogen sulfide in nitrogen gas fed at 411 cc/minute and hydrogen gas fed at 276 cc/minute. Nitrogen was used during the heat up and cool down at 68 cc/minute. The gases provided a reducing atmosphere at high temperature to form iron sulfide and iron sulfate reactions within the sand.

This reacted sand was tested in both static rotator tests and flow-through column tests to ascertain contaminant removal performance. Mercury was the contaminant evaluated.

Rotator Tests:

0.2 grams of the reacted sand was placed into a capped jar containing 100 ml of a 500 µg/liter mercury solution. The mercury solution was prepared from a Mercury, 1000 µg/ml Standard in nitric acid manufactured by J. T. Baker, catalog #6459-04, by diluting 1 ml of Mercury Standard in 2000 ml of distilled water. The capped jar containing the reacted sand proppant and 500 µg/L mercury solution was placed on a rotator and rotated slowly. Mercury removal analysis was conducted at 2.5 hours and 24 hours of rotation on aliquots of water drawn from the jar. Mercury analysis was done using EPA Method 245.1 on a Lumex mercury analyzer. The Lumex is an atomic absorption unit that detects mercury which has been vaporized with a 10% stannous chloride solution. This analysis method was used for all testing in Example 1.

The rotator static screening test indicated a high level of mercury removal from the 500 µg/L Hg standard by the reacted sand.

TABLE 2

| Reacted Sand | % Hg Removal @2.5 Hours | % Hg Removal @ 24 Hours |
|---|---|---|
| NB2-236 | 99 | 99 |
| NB2-256 | 80 | 96 |

Flow-Through Column Tests:

Two packed bed columns of reacted sand were run to determine the level of mercury removal at two different concentrations of mercury in Solon tap water. These mercury concentrations were: 100 ppb (µg/L) and 100 ppt (ng/L) mercury.

The columns were 1.0 cm in diameter and 22 grams of reacted sand was placed into each column. The empty bed volume of the columns was 13.3 ml and water containing mercury contaminant was pumped through the column in an up flow direction. Table 3 details the column operating conditions.

TABLE 3

| Reacted Sand | Hg Concentration | Water Flow Rate | Water-to-Media Contact Time |
|---|---|---|---|
| NB2-236 | 100 ppb | 2.9 ml/min | 4.6 min |
| NB2-256 | 100 ppt | 2.0 ml/min | 6.6 min |

The mercury concentrations of the column test water were prepared from a 1000 µg/L mercury stock solution according to the following methods:

1. 100 ppb: 1.0 ml of 1000 µg/L Hg stock solution was diluted to 1000 ml with tap water for a concentration of 1000 µg/L Hg. Then 100 ml of this solution was further diluted to 1000 ml with tap water for a final concentration of 100 µg/L and a pH of 7.08.

2. 100 ppt: 1.0 ml of the 1000 µg/L Hg stock solution from step 1 above was diluted to 1000 ml with tap water for a concentration of 1000 ng/L Hg. 100 ml of the 1000 ng/L Hg solution was further diluted to 1000 ml with tap water for a final concentration of 100 ng/L Hg and pH of 7.15.

Solon tap water is a moderate hardness water characteristic of the Great Lakes region. It nominally contained 31 ppm calcium, 8 ppm magnesium, 25 ppm chloride, 27 ppm sulfate, 0.5 ppm phosphorous, 0.03 ppm iron, pH of 6.9 and 4 ppm suspended solids.

Up to 150 bed volumes of each of the mercury containing waters was flowed through the columns of reacted sand proppant. Mercury removal was significant for both mercury concentrations. The expected initial concentration of mercury was 100 ppt, but the measured value was higher at 421 ppt.

As is shown in Table 4 below, contaminant removal was sustained over a significant treated volume of material, e.g. 150 bed volumes. This demonstrates that the treated proppant was effective at removal of mecury for large volumes of contaminated liqud.

TABLE 4

| Reacted Sand Column Hg Removal | | |
|---|---|---|
| Inlet Hg Concentration, | Avg. Hg in Column Outlet over 150 Bed Volumes | % Hg Removal |
| 116 µg/L | 0.78 µg/L | 99.3% |
| 421 ng/L* | 233 ng/L | 45% |

This example of reacted sand proppant showed 45% to 99% mercury removal and it was sustained.

Example 2

Activated alumina and alumina based proppants are also known. An iron promoted activated alumina substrate upon which sulfur was reacted in a hydrogen reducing atmosphere at 420 degrees F. was obtained from the commercial manufacture of Sorbster product from MAR Systems Inc., Cleveland, Ohio.

This reacted alumina based proppant was tested for multi-metals removal from an oil refining water. For this study, 35,000 gallons of water (equivalent to 1000 bed volumes) was treated by the reacted alumina based proppant. Selenium was the primary contaminant investigated but fluoride, arsenic, zinc, vanadium, nitrate and barium removal were also studied.

Refinery wastewater was pumped at 1.0 gpm and a flow flux of 2.86 gpm/ft2 upflow through four vessels connected in series that contained the reacted alumina proppant. 200 lbs. of reacted alumina proppant was used and the water-to-media contact time was 31 minutes. The concentration of metal and ion contaminants were measured at the inlet and outlet using the following methods: the metal contaminants were tested using ICP/MS according to Environmental Protection Agency (EPA) protocol EPA 6020; the ion contaminants were tested using ion chromatography following the EPA approved Standard Method protocol SM 4110B.

Nominally the inlet wastewater contained 40 ppb selenium, 117 ppm calcium, 41 ppm magnesium, 1609 ppm chloride, 351 ppm sulfate, 2.2 ppm fluoride, 3 ppb vanadium, 15 ppb arsenic, 22 ppb zinc, 5 ppm nitrate and 300 ppb barium. Samples of the inlet water and the reacted alumina proppant treated water outlet water were taken daily and analyzed for contaminant levels.

Contaminant removal was significant and sustained. The average removal over the 35,000 gallons of water treated is summarized in Table 5 for the targeted contaminants.

TABLE 5

Reacted Alumina Multi Contaminant Removal

| Contaminant | Inlet Concentration | Average Outlet Concentration | Average % Removal |
|---|---|---|---|
| Selenium | 40 ppb | 9 ppb | 78% |
| Fluoride | 2.5 ppm | 1.5 ppm | 40% |
| Arsenic | 15 ppb | 9 ppb | 40% |
| Zinc | 22 ppb | 7 ppb | 68% |
| Vanadium | 3 ppb | 1 ppb | 67% |
| Nitrate | 2.0 ppm | 1 ppm | 50% |
| Barium | 300 ppb | 218 ppb | 27% |

It should now be apparent that various embodiments of the present invention accomplish the object of this invention. Various proppant compositions can act as a substrate in a process that imparts sorbent properties to the proppant. Contaminant removal by the reacted proppant has been demonstrated. This contaminant removal enables the proppant, when placed down hole, to remove various contaminants in-situ and make the flow back and produced waters from well treatments less hazardous and more readily reusable. The reacted proppant can be used to completely replace conventional proppants, but it in some embodiments it may also be mixed with conventional proppants in any proportion desired. In further embodiments, the reacted proppant can be designed to treat the particular type of contaminated fluid present at a given well by adjusting which proppant substrates are used and which active compounds are used.

It should be appreciated that the present invention is not limited to the specific embodiments described above, but includes variations, modifications and equivalent embodiments defined by the following claims.

What is claimed is:

1. A sorption composition, comprising: a substrate material and an active compound for contaminant removal incorporated into or onto the substrate material, wherein the substrate material is a particulate material selected from the group consisting of ceramic, admixtures containing ceramics, and ceramic beads and wherein the active compound is a sulfur compound selected from the group consisting of ferrous sulfide, elemental sulfur, ferric ammonium sulfate, sodium hydrosulfide, dimethyl disulfide, dithiocarbamates, aluminum sulfide, copper sulfate, copper sulfide, and copper sulfate ammoniated, wherein the sulfur content, as % S, is from 0.1 to 25 wt %.

2. The sorption composition of claim 1, wherein the substrate material contains at least 0.1% iron.

3. The sorption composition of claim 1, wherein the substrate material contains at least 0.1% copper.

4. The sorption composition of claim 1, wherein the substrate material contains both iron and copper.

5. The sorption composition of claim 1, wherein the substrate material contains oxides of copper.

6. The sorption composition of claim 1, wherein the substrate material contains oxides of iron.

7. The sorption composition of claim 1, wherein the substrate material is unfinished.

8. The sorption composition of claim 1, wherein the sorption composition further comprises an ammonia compound.

9. The sorption composition of claim 8, wherein the ammonia compound is selected from the group consisting of ferric ammonium sulfate, ammonium thiosulfate, ammonium thiocyanate, ammonium sulfate, ammonium sulfite, ammonium persulfate, and aluminum ammonium sulfate.

* * * * *